United States Patent
Kusama et al.

(10) Patent No.: US 7,346,532 B2
(45) Date of Patent: Mar. 18, 2008

(54) WORKFLOW SYSTEM

(75) Inventors: Takato Kusama, Yokohama (JP);
Nobuo Beniyama, Kawasaki (JP);
Atsuhito Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 600 days.

(21) Appl. No.: 10/140,981

(22) Filed: May 9, 2002

(65) Prior Publication Data

US 2002/0169752 A1   Nov. 14, 2002

(30) Foreign Application Priority Data

May 10, 2001   (JP)   ............................. 2001-140210

(51) Int. Cl.
*G06F 17/50*   (2006.01)
(52) U.S. Cl. ......................................... 705/8
(58) Field of Classification Search ........ 709/223–224, 709/249, 253; 705/8
See application file for complete search history.

(56) References Cited

U.S. PATENT DOCUMENTS

| | | | |
|---|---|---|---|
| 5,301,320 A * | 4/1994 | McAtee et al. ................ 705/9 |
| 5,918,226 A | 6/1999 | Tarumi et al. | |
| 5,937,388 A * | 8/1999 | Davis et al. ................... 705/8 |
| 6,041,306 A * | 3/2000 | Du et al. ........................ 705/8 |
| 6,151,583 A * | 11/2000 | Ohmura et al. ................ 705/8 |
| 6,401,073 B1 * | 6/2002 | Tokuda et al. ................ 705/8 |
| 6,401,119 B1 * | 6/2002 | Fuss et al. ................... 709/224 |
| 6,601,035 B1 * | 7/2003 | Panagos et al. ................ 705/8 |
| 6,654,708 B2 * | 11/2003 | Nemoto et al. ............. 702/187 |
| 6,707,903 B2 * | 3/2004 | Qutub et al. ........... 379/265.02 |
| 6,937,993 B1 * | 8/2005 | Gabbita et al. ................ 705/8 |
| 7,136,825 B2 * | 11/2006 | Araki et al. .................... 705/9 |

FOREIGN PATENT DOCUMENTS

JP        A-8-190584        7/1996

OTHER PUBLICATIONS

Lee "Workflow tackles the productivity paradox. (workflow automation software", Aug. 1995, Damation, v41, n15, p65(3), Dialog file 47, Accession No. 04329868.*

* cited by examiner

*Primary Examiner*—Romain Jeanty
(74) *Attorney, Agent, or Firm*—Mattingly, Stanger, Malur & Brundidge, P.C.

(57) ABSTRACT

A workflow system controls work which includes a plurality of works. A stagnated work in a stagnation state is grasped, and processing priorities of works having a relation to the stagnated work are established in accordance with the relation. Particularly, a processing priority of a work, of which the processing progress is influenced due to the stagnated work in the stagnation state, is established to be lower.

31 Claims, 12 Drawing Sheets

0143

WORKER LOAD INFORMATION

0711

WORKER LOAD INFORMATION TABLE

| 0701 | 0702 | 0703 | 0704 | 0705 |
|---|---|---|---|---|
| WORKER INFORMATION | NUMBER OF UNIMPLEMENTED WORKS | EFFECTIVE FLAG | STAGNATION THRESHOLD | INACTIVITY THRESHOLD |
| YAMADA | 5 | Yes | 5 | 1 |
| MIURA | 43 | Yes | 7 | 1 |
| SAITO | 2 | Yes | 20 | 1 |
| Program1 | 3 | Yes | 100 | 10 |
| ... | ... | ... | ... | ... |

FIG. 3

PROCESS DEFINITION

CONTROL NODE DEFINITION INFORMATION TABLE (0311)

| PROCESS DEFINITION NAME (0301) | CONTROL NODE NAME (0302) | NODE CLASSIFICATION (0303) |
|---|---|---|
| PD1 | s | START |
| PD1 | e | END |
| PD1 | x | SPLIT |
| PD1 | w | JOIN |
| PD2 | ... | ... |

WORK DEFINITION INFORMATION TABLE (0411)

| PROCESS DEFINITION NAME (0401) | WORK DEFINITION NAME (0402) | WORK CLASSIFICATION (0403) | WORK INFORMATION (0404) | RELEVANCE-TO-DESTINATION DEGREE (0405) | PRIORITY (0406) | STAGNATION THRESHOLD (0407) |
|---|---|---|---|---|---|---|
| PD1 | A | IMPLEMENTATION BY WORKER | YAMADA | DEPENDENCE | HIGH | 10 |
| PD1 | B | AUTOMATIC IMPLEMENTATION | Program1 | DEPENDENCE | MIDDLE | 20 |
| PD1 | C | AUTOMATIC IMPLEMENTATION | Program2 | INDEPENDENCE | MIDDLE | 100 |
| PD1 | D | IMPLEMENTATION BY WORKER | MIURA | DEPENDENCE | LOW | 5 |
| PD2 | ... | ... | ... | ... | ... | ... |

ARROW DEFINITION INFORMATION TABLE (0511)

| PROCESS DEFINITION NAME (0501) | SOURCE OF MOVEMENT (0502) | DESTINATION OF MOVEMENT (0503) |
|---|---|---|
| PD1 | s | A |
| PD1 | A | x |
| PD1 | x | B |
| PD1 | x | D |
| PD2 | B | C |
| | ... | ... |

FIG. 4

WORKFLOW IMPLEMENTATION STATE INFORMATION 0142

WORKFLOW IMPLEMENTATION STATE TABLE 0611

| PROCESS INSTANCE NAME 0601 | PROCESS DEFINITION NAME 0602 | WORK DEFINITION NAME 0603 | WORK INFORMATION 0604 | STATE 0605 |
|---|---|---|---|---|
| PI1 | PD1 | A | YAMADA | Completed |
| PI1 | PD1 | B | Program1 | Completed |
| PI1 | PD1 | C | Program2 | Ready |
| PI2 | PD1 | A | YAMADA | Initial |
| PI2 | ... | | | |

FIG. 5

WORKER LOAD INFORMATION

WORKER LOAD INFORMATION TABLE 0711

| WORKER INFORMATION 0701 | NUMBER OF UNIMPLEMENTED WORKS 0702 | EFFECTIVE FLAG 0703 | STAGNATION THRESHOLD 0704 | INACTIVITY THRESHOLD 0705 |
|---|---|---|---|---|
| YAMADA | 5 | Yes | 5 | 1 |
| MIURA | 43 | Yes | 7 | 1 |
| SAITO | 2 | Yes | 20 | 1 |
| Program1 | 3 | Yes | 100 | 10 |
| ... | ... | ... | ... | ... |

FIG. 6

BUSINESS PROGRAM EXECUTION REQUEST MANAGEMENT INFORMATION 0144

BUSINESS PROGRAM EXECUTION REQUEST MANAGEMENT TABLE 0811

| PROCESS DEFINITION NAME 0801 | WORK DEFINITION NAME 0802 | PROCESS INSTANCE NAME 0803 | WORK INFORMATION 0804 | OCCURRENCE DATE 0805 |
|---|---|---|---|---|
| PD03 | A3 | P1 | Program1 | '01/01/08-13:00 |
| PD02 | B2 | P2 | Program1 | '01/01/02-08:07 |
| PD06 | A6 | P3 | Program2 | '01/01/18-21:30 |
| PD02 | C2 | P4 | Program1 | '01/01/04-02:00 |
| PD03 | ... | ... | ... | ... |

FIG. 9

| PROCESS DEFINITION NAME | WORK DEFINITION NAME | INFLUENCING WORK DEFINITION |
|---|---|---|
| PD1 | C | A |
| PD1 | C | B |
| PD1 | B | A |
| PD1 | E | D |
| PD2 | ... | ... |
| | | |

WORKFLOW SYSTEM

BACKGROUND OF THE INVENTION

The present invention relates to a workflow system for supporting management of implementation of works and the progress state of business composed of a plurality of works on the basis of a process definition which previously defines a flow of business, and more particularly to technique effective for application to a workflow system for supporting management of implementation of works and the progress state of business in consideration of the presence of a stagnated or delayed work in the business, in the workflow management system.

The workflow system is the technique for defining a flow of business composed of a plurality of works as a process definition previously and supporting management of implementation of the works and the progress state of the business on the basis of the process definition. The process definition is said to be a modeled flow of business. Processing in each work is sometimes performed by people and is sometimes executed by a business program automatically. The workflow system performs assignment of works to people and implementation control of processing by the business program to perform the state management and the progress management as the whole business flow.

In such a workflow system, there is a problem that a work is stagnated or delayed when a large quantity of works are assigned to a worker or when a worker is absent. Generally, the stagnated work is assigned to another worker to thereby solve the above problem. Such a solving method is disclosed in U.S. Pat. No. 5,918,226, for example. This US patent discloses the workflow system that a stagnation state where a work is stagnated or delayed can be solved by withdrawal and redistribution of stagnated circulating documents.

SUMMARY OF THE INVENTION

In the above-mentioned conventional method in which the stagnated work is assigned to another worker to thereby solve the stagnation state, however, when any worker to which the stagnated work is assigned is not existent, the method cannot be applied. There is a possibility that the stagnated work cannot be assigned to another worker when technical knowledge, a special processing apparatus or the like is required for implementation of the stagnated work or when excess personnel do not exist, for example. Further, even when the stagnated work can be assigned to another worker, a work is stagnated or delayed if a large quantity of works exceeding the processing ability thereof occur.

The stagnated work contains a work that is not quite forward, and even a work which is progressing but the progress state of which is delayed as compared with the schedule thereof.

When a stagnated work occurs, a work relative to the stagnated work is also influenced. For example, in a process instance in which a work existing upstream of a stagnated work is being implemented, the progress of business processing is influenced by the stagnated work. In this case, when a work in a source of movement to be implemented just before the stagnated work has been implemented, the process instance is moved to the stagnated work after completion of the work and the progress of business processing is interrupted in the stagnated work. In such a case, when a worker is engaged in a plurality of different businesses, it is efficient as a whole that the worker implements another business processing preferentially as compared with implementation of the work of which the progress of business is interrupted just after the movement thereto, and human resources of workers can be utilized effectively. Particularly, the degree that the human resources can be utilized effectively is increased when the priority of the work which is moved to the stagnated work after completion of processing thereof is high. This reason is that the worker specifies the work to be processed on the basis of the priority related to the work. In such case, the human resources and the computer resources are preferentially assigned to the work which is moved to the stagnated work regardless of whether a business which can be implemented without stagnation is existent or not, so that its effect is more remarkable.

Further, the works related to the stagnated work contain other works besides the work existing upstream. For example, works existing downstream and works existing in parallel are contained. That is, the works related to the stagnated work contain works influencing the progress of business processing due to stagnation of the stagnated work.

It is an object of the present invention to solve the above-mentioned problem by providing technique capable of, when a work is stagnated, preferentially distributing computer resources and human resources to a process instance of which the progress of business is not influenced due to the stagnated work.

According to the present invention, in a workflow system for managing implementation of works on the basis of process definition information which defines the relation among a plurality of works in the business, the processing priority of work is established or modified in accordance with the stagnation state of work. This means that the processing priority of work having a predetermined relation to the work being stagnated is established or modified. Further, the process definition information contains process definition information for defining a plurality of works and a processing order among the plurality of works.

An example of processing according to the present invention is as follows.

In the workflow system of the present invention, first, the number of unimplemented works is acquired for each of the works. A work having the number of the unimplemented works which exceeds a previously defined threshold is retrieved to thereby detect a stagnated work.

Next, the process definition is used to detect at least one of a range of works of which the progress of business is influenced due to the stagnated work and works of which the progress of business is influenced due to the stagnated work.

The processing priority of the works contained in the work range or the works influenced is made low, and an implementation request of works is issued in order of the high processing priority. With implementation of this processing, the works of which the progress of business is influenced due to the stagnated work are processed with the priority thereof being made low. Consequently, the computer resources and the human resources can be distributed to the businesses by which the progress of the process instance is not influenced.

Further, according to the present invention, the following processing is contained. That is, at least one of the range of works of which the progress of business is not influenced due to a detected stagnated work and works of which the progress is not influenced is detected. Processing for making high a processing priority of a work contained in the detected work range or the detected work is performed.

Moreover, a combination of the processing for increasing the processing priority and the processing for reducing the processing priority is also contained in the present invention. That is, the processing priority of the work influenced is made low and the processing priority of the work not influenced is made high.

As described above, according to the present invention, the processing priority of each work is modified or established in accordance with the stagnation state of a work and when a stagnated work occurs the computer resources and the human resources can be distributed preferentially to the process instance of which the progress of business is not influenced due to the stagnated work.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing an example of the process definition 0141 in the embodiment contained in the present invention;

FIG. 4 is a diagram showing an example of a workflow implementation state table in the embodiment contained in the present invention;

FIG. 5 is a diagram showing an example of a worker load information table in the embodiment contained in the present invention;

FIG. 6 is a diagram showing an example of a business program execution request management table in the embodiment contained in the present invention;

FIG. 9 is a diagram showing an example of an influence range definition table in the embodiment contained in the present invention;

DESCRIPTION OF THE EMBODIMENTS

A workflow management system according to an embodiment of the present invention is now described. The workflow management system supports management of implementation of works and the progress state of business on the basis of a process definition which previously defines a flow of business composed of a plurality of works, and changes the processing priority in accordance with a stagnation state of work.

In an example of the workflow management system of the embodiment described below, since functions and details thereof unnecessary for explanation of the present invention are omitted, the system is simplified as compared with a general workflow management system, but an application range of the present invention is not limited.

Figure 1:
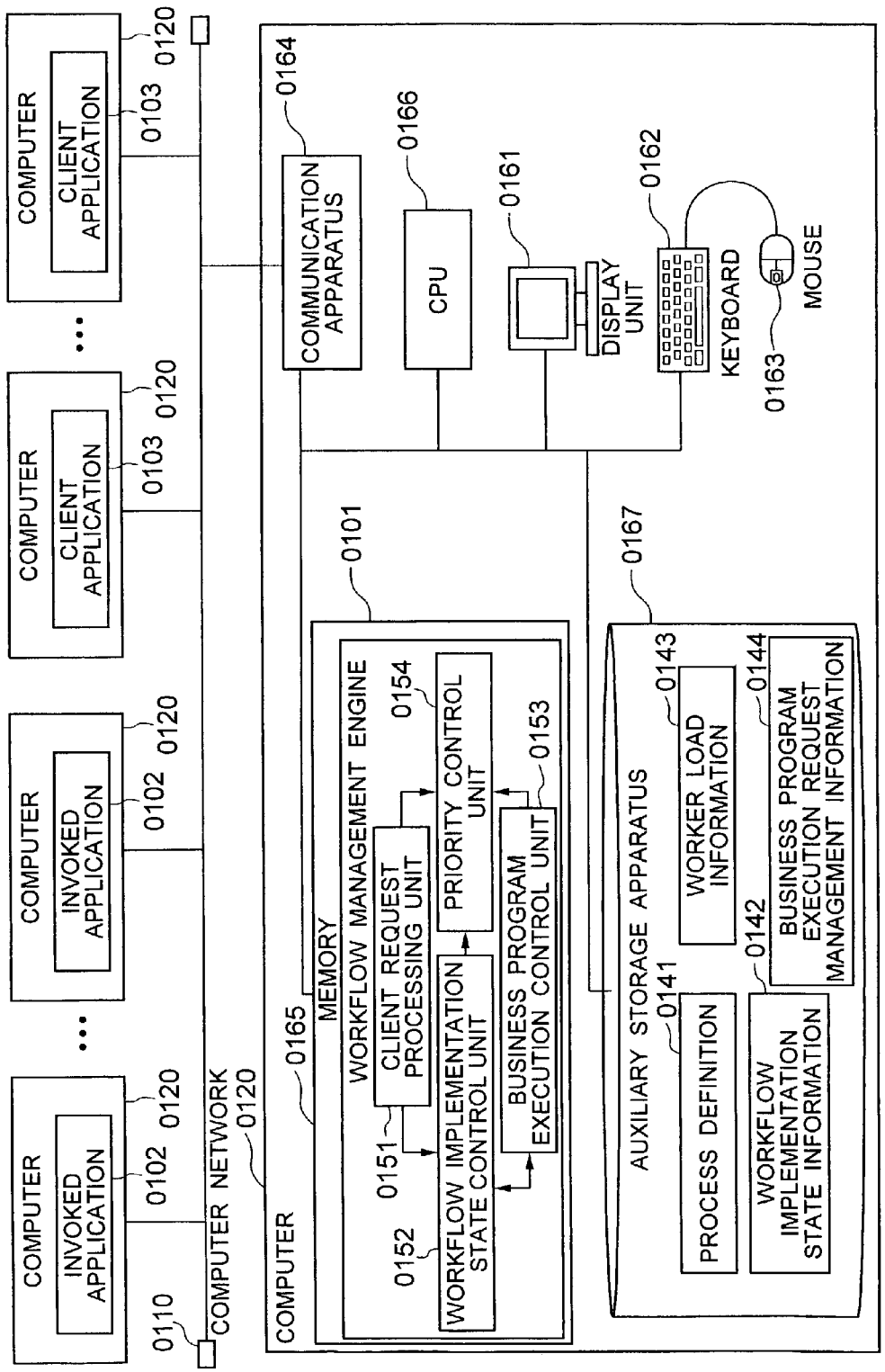
FIG. 1 is a block diagram schematically illustrating a workflow management system according to an embodiment contained in the present invention.

FIG. 1 is a diagram schematically illustrating the workflow management system of the embodiment. As shown in FIG. 1, a computer 0120 realizing the workflow management system of the embodiment includes a client request processing unit 0151, a workflow implementation state control unit 0152, a business program execution control unit 0153 and a priority control unit 0154.

The client request processing unit 0151 is a processing unit for receiving a command transmitted from a client application 0103. The workflow implementation state control unit 0152 is a processing unit for receiving a command transmitted from the client request processing unit 0151 and the business program execution control unit 0153 and modifying workflow implementation state information 0142 properly in accordance with a process definition 0141.

The business program execution control unit 0153 is an implementation control unit for requiring implementation of each work in accordance with a processing priority of each work. The priority control unit 0154 is a processing unit for judging the stagnation state of a work and specifying a range of works of which the progress of business is influenced due to stagnation of the work to decide the processing priorities to the works contained in the specified work range.

The program for functioning the workflow management system as the client request processing unit 0151, the workflow implementation state control unit 0152, the business program execution control unit 0153 and the priority control unit 0154 is recorded in a recording medium such as a CD-ROM and then stored in a magnetic disk or the like. Further, the stored program is loaded into a memory to be executed actually. The recording medium for recording the program may be other recording medium besides the CD-ROM. The storage medium may be any medium for storing information and may contain a DVD and a floppy disk. Further, the program may be used by installing it into an information processing unit from the recording medium or by accessing it through a network.

The computer 0120 of the embodiment includes a display unit 0161, a keyboard 0162, a mouse 0163, a communication apparatus 0164, a memory 0165, a CPU 0166 and an auxiliary storage apparatus 0167.

A workflow management engine 0101, an invoked application 0102 and the client application 0103 are software programs and stored in the auxiliary storage apparatus 0167. The software programs are read in the memory 0165 upon execution and executed by the CPU 0166.

Further, the software programs can talk with the operator or worker by means of an input unit such as the display unit 0161, the keyboard 0162 and the mouse 0163. Moreover, the software programs can communicate with software programs operating in other computers 0120 through a computer network 0110 by means of the communication apparatus 0164. In addition, the software programs may operate in the same computer 0120 and may operate in different computers 0120 through the computer network 0110.

The workflow management engine 0101 manages the implementation state of works and a flow of business on the basis of the process definition 0141 which previously defines the processing procedure of works. Further, the workflow management engine 0101 transmits a processing request to the invoked application 0102 through the computer network 0110 and obtains a result thereof. The workflow management engine 0101 receives a processing request from the client application 0103. Operation of the workflow management engine 0101 will be described later.

The invoked application 0102 receives an implementation request of business processing from the workflow management engine 0101 and implements the business processing for works without need of worker's hands to return a notification of completion or occurrence of trouble after implementation of the business processing.

The client application 0103 is a software program for performing processing by direct operation by a worker. The client application 0103 obtains a work assigned to the worker to the workflow management engine 0101. The client application 0103 controls to display the obtained result in the display unit 0161 and performs the business processing for the assigned work. Further, the client application 0103 notifies completion of the work to the workflow management engine 0101 after completion of the business processing for the work.

In the embodiment, it is judged that a stagnation state is occurring when a worker is absent, when any trouble occurs in the business program, when the number of works which are not implemented exceeds a predetermined threshold or when the number of works having the state set to "ready" exceeds a predetermined threshold. The processing priority in the embodiment represents the priority order of each work at the time that the business program execution control unit 0153 requires implementation of works.

Figure 2:
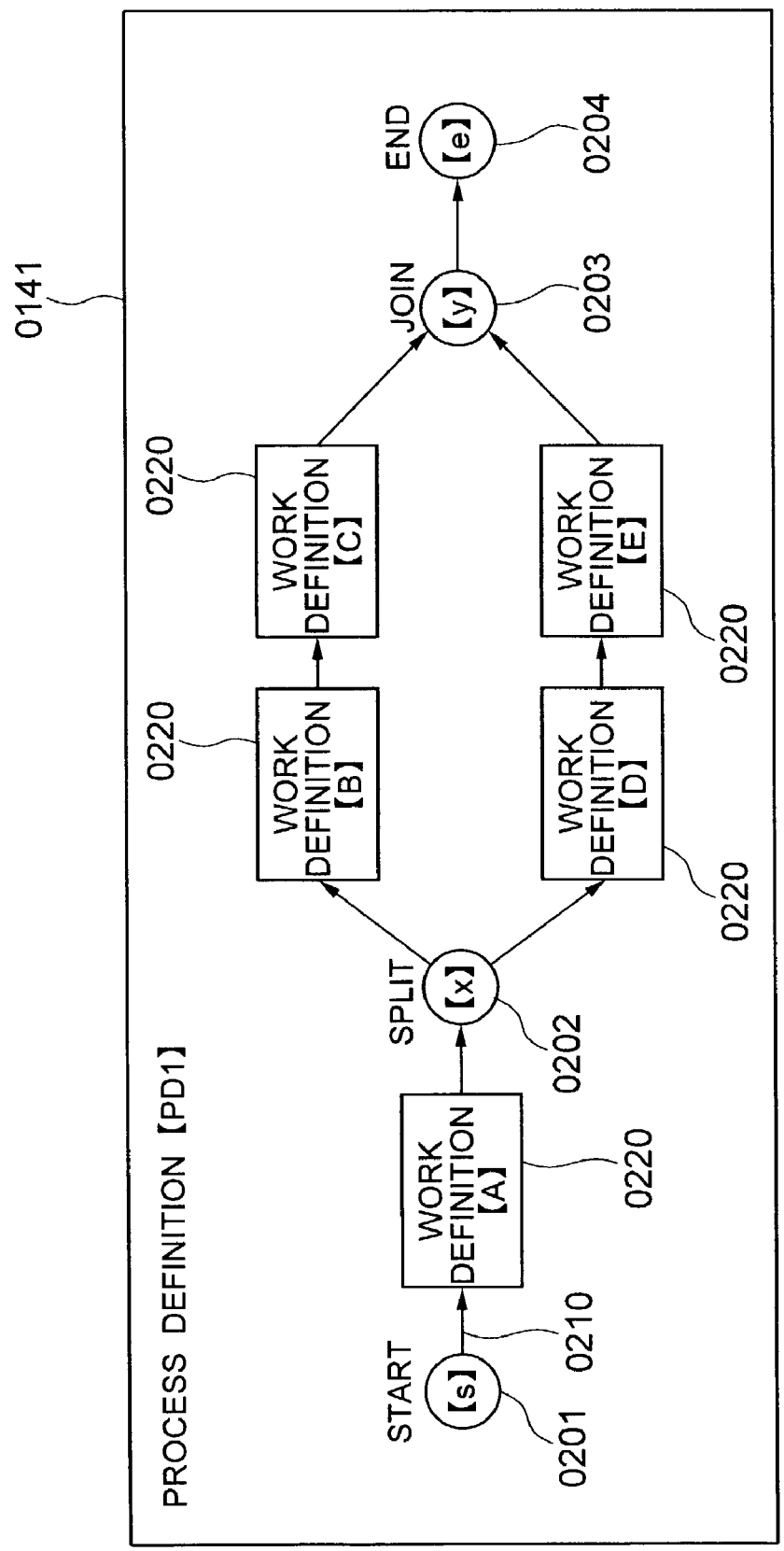
FIG. 2 is a diagram illustrating a definition image of a process definition 0141 in the embodiment contained in the present invention.

FIG. 2 is a diagram illustrating a definition image of the process definition 0141 in the embodiment. In the embodiment, a plurality of previously defined process definitions 0141 are stored in the auxiliary storage apparatus 0167.

The process definition 0141 is expressed by a directed graph having a plurality of work definitions 0220 and arrows 0210 connecting the plurality of work definitions 0220. A start point, an end point, a split point and a join point of the directed graph are expressed by means of special nodes on the directed graph named control nodes.

In FIG. 2, reference numerals 0201 to 0204 denotes control nodes including a start node 0201, an end node 0204, a split node 0202 and a join node 0203. The directed graph is started from the start node 0201 and is ended at the end node 0204.

Referring now to FIG. 3, details of the process definition 0141 and an example of the process definition stored in the auxiliary storage apparatus 0167 are described.

FIG. 3 is a diagram showing an example of the process definition 0141 in the embodiment. As shown in FIG. 3, definition information relative to the control nodes 0201 to 0204 in the process definition 0141 is stored in a control node definition information table 0311. Further, definition information relative to the work definitions 0220 is stored in a work definition information table 0411. Furthermore, definition information relative to the arrows 0210 is stored in an arrow definition information table 0511. Since information relative to the plurality of process definitions 0141 is stored in each table, the tables have process definition names described in first columns (columns 0301, 0401 and 0501 in FIG. 3) for uniquely specifying which process definition 0141 the information stored in each table belongs to. Details of the columns are now described for each table.

In the control node definition information table 0311, a control node name 0302 indicates names for specifying the control nodes 0201 to 0204. A node classification 0303 indicates kinds of the control nodes, including "start", "end", "split" and "join".

In the work definition information table 0411, a work definition name 0402 indicates names for uniquely specifying the work definition 0220 in the process definition 0141. A work classification 0403 indicates any value of "implementation by worker" and "automatic implementation", whereby it is indicated that the business processing for the work definition is implemented by directly operating the client application 0103 by the worker ("implementation by worker") or the work processing for the work definition is implemented without need of worker's hands by transmitting a processing request to the invoked application 0102 by means of the workflow management engine 0101 ("automatic implementation").

Work information 0404 designates a worker's name for specifying a worker who is to process the work when the work classification 0403 is the "implementation by worker" and designates a program name for specifying the invoked application 0102 which is to process the work when the work classification 0403 is the "automatic implementation".

A relevance-to-destination degree 0405 indicates any value of "dependence" and "independence", whereby it is indicated that the processing priority of the work definition is influenced in accordance with a state of the work at a destination of movement ("dependence") or the processing priority is not influenced ("independence").

A priority 0406 represents a priority order of processing of the work definition and indicates any value of "high", "middle" and "low". A stagnation threshold 0407 represents information for judging a stagnation state of the work definition. When the number of works which are not implemented of the work definition exceeds the stagnation threshold 0407, the workflow management engine 0101 judges that the work definition is in the stagnation state.

In the arrow definition information table 0511, the work definition 0220 or the control nodes 0201 to 0204 corresponding to a start point and an end point of the arrow 0210 in the process definition 0141 are set in a source of movement 0502 and a destination of movement 0503.

The workflow implementation state information 0142 represents an implementation state of works in a unit of the process instance and is stored in the auxiliary storage apparatus 0167. Details of the workflow implementation state information 0142 and a format thereof stored in the auxiliary storage apparatus 0167 are described with reference to FIG. 4.

FIG. 4 is a diagram showing an example of a workflow implementation state table in the embodiment. Each record of the workflow implementation state table 0611 shown in FIG. 4 holds a state of each work in the process instance.

A process instance name 0601 is a name for uniquely specifying each process instance. A process definition name 0602 indicates the process definition 0141 constituting a model of the process instance. A work definition name 0603 indicates the work definition 0220 constituting a model of the work. Work information 0604 indicates a name of a worker who is to implement the work when the work classification is the "implementation by worker" and indicates a program name for specifying the invoked application 0102 which processes the work when the work classification is the "automatic implementation".

A state 0605 indicates any value of "initial", "ready" and "completed" in the state of the work. The "initial" represents the initial state of the work, the "ready" represents a state that the business processing for the work can be started, and the "completed" represents that the business processing for the work is completed.

The worker load information 0143 is information for managing the number of works in the "ready" state assigned to the workers and the invoked applications 0102. Details of the worker load information 0143 and a format thereof stored in the auxiliary storage apparatus 0167 are described with reference to FIG. 5.

FIG. 5 is a diagram showing an example of a worker load information table in the embodiment. Each record of the worker load information table 0711 shown in FIG. 5 represents the number of works in the "ready" state for the previously registered workers or invoked applications 0102.

Work information 0701 indicates a name of worker or the invoked application 0102. The number of unimplemented works 0702 indicates the number of works in the "ready" state assigned currently to the worker or the invoked application indicated in the work information 0701.

An effective flag 0703 indicates whether the worker or the invoked application 0102 can be utilized or not, and when it can be utilized, the flag is set to "Yes", and when it cannot be utilized, the flag is set to "No". For example, when the worker is absent or when any trouble occurs in the invoked application 0102, the effective flag 0703 is set to "No".

A stagnation threshold 0704 is information for judging a stagnation state of the worker or the invoked application. The stagnation threshold 0704 is used to judge the stagnation state. In a judgment method, for example, when the number of unimplemented works 0702 in the worker or the invoked application indicated by the work information 0701 exceeds the threshold, the worker or the invoked application is judged to be in the stagnation state.

An inactivity threshold 0705 is information for judging an inactive or idle state of the worker or the invoked application. The inactivity threshold 0705 is used to judge the inactive or idle state. In a judgment method, for example, when the number of unimplemented works 0702 in the worker or the invoked application indicated by the work information 0701 is smaller than the inactivity threshold, the worker or the invoked application is judged to be in the inactive or idle state.

The business program execution request management information 0144 manages a start request to the invoked application 0102. When the state of the work definition having the work classification set to the "automatic implementation" becomes the "ready", the workflow management engine 0101 registers the start request to the invoked application 0102 in the business program execution request management information 0144. A format of the start request to the invoked application 0102 stored in the auxiliary storage apparatus 0167 is shown in FIG. 6.

FIG. 6 is a diagram showing an example of a business program execution request management table in the embodiment. As shown in FIG. 6, the start request is stored in the business program execution request management table 0811 record by record for each start request.

A process definition name 0810, a work definition name 0802 and a process instance name 0803 uniquely specify the work which is a source issuing an implementation request. Work information 0804 is a name for specifying the invoked application 0102 which performs the business processing in response to the implementation request and is obtained from a column of the work information 0404 of the work definition information table 0411. An occurrence date 0805 indicates the date that the implementation request occurs.

Next, operation of the workflow management engine 0101 is described. As shown in FIG. 1, the workflow management engine 0101 includes the client request processing unit 0151, the workflow implementation state control unit 0152, the business program execution control unit 0153 and the priority control unit 0154. In the following description, the work produced from the work definition is named a work item.

The client request processing unit 0151 receives a command transmitted from the client application 0103. The client request processing unit 0151 receives a worklist acquirement command "GetWorkList", a work completion notification command "CompleteWork", a process instance start command "StartProcess", a worker absence notification command "StopWorker" and a worker return notification command "RestartWorker" from the client application 0103.

The worklist acquirement command "GetWorkList" is a command for receiving the worker's name and returning a list of work items assigned to the worker. The work completion notification command "CompleteWork" is a command for receiving the process definition name, the process instance name and the work definition name and notifying completion of the designated work items. The process instance start command "StartProcess" is a command for receiving the process definition name and the process instance name and inputting the process instance of the designated process definition by the designated process instance name to start it. The worker absence notification command "StopWorker" is a command for receiving the worker's name and notifying that the worker is absent. The worker return notification command "RestartWorker" is a command for receiving the worker's name or the name of the invoked application and notifying that the worker returns or that the invoked application is recovered from trouble.

Processing of the client request processing unit 0151 upon reception of the command is now described.

For the worklist acquirement command "GetWorkList", a list of work items assigned to the designated worker is returned in the following processing procedure.

First, a "work priorities acquiring " command is transmitted to the priority control unit 0154 to thereby acquire a list of work items managed in the workflow management engine 0101. At this time, each of the work items in the list is uniquely specified by the process definition name, the process instance name and the work definition name, and holds the processing priority of the work item as attribute information.

Next, the work item assigned to the worker designated by the worklist acquirement command "GetWorkList" is obtained from the list of work items. The work item assigned to the worker is obtained by retrieving the work item having the worker's name in the work information 0604 from the workflow implementation state table 0611 using the work information 0604 as key.

For the work completion notification command "CompleteWork", the process definition name, the process instance name and the work definition name are received, and a "work completion request" command is transmitted to the workflow implementation state control unit 0152. When the workflow implementation state control unit 0152 receives the "work completion request" command, the control unit 0152 performs completion processing of the work item designated by the process definition name, the process instance name and the work definition name, and sets the state of the work item which can be started newly to the "ready" state.

For the process instance start command "StartProcess", the process definition name, the process instance name and the process definition name are received, and a "process instance start request" command is transmitted to the workflow implementation state control unit 0152. When the workflow implementation state control unit 0152 receives the "process instance start request" command, the control unit 0152 performs start processing of the process instance designated by the process definition name and the process instance name, and sets the state of the work item which can be started newly to the "ready" state.

For the worker absence notification command "Stop-Worker", the worker's name is received and the "worker absence notification" command is transmitted to the priority control unit 0154. When the priority control unit 0154 receives the "worker absence notification" command, the control unit 0154 updates information concerning the worker held in the worker load information table 0711.

For the worker return notification command "Restart-Worker", the worker's name or the name of the invoked application is received, and the "worker return notification" command is transmitted to the priority control unit 0154. When the priority control unit 0154 receives the "worker return notification" command, the control unit 0154 updates information concerning the worker or the invoked application held in the worker load information table 0711.

The workflow implementation state control unit 0152 receives a command transmitted from the client request processing unit 0151 and the business program execution control unit 0153, and modifies the workflow implementation state information 0142 on the basis of the process definition 0141 in response to the received command.

The workflow implementation state control unit 0152 receives the "process instance start request" command for performing start processing of a new process instance and the "work completion request" command for performing completion processing of the work item.

The "process instance start request" command is transmitted from the client request processing unit 0151. The "process instance start request" command is a command for receiving the process definition name and the process instance name, starting the designated process definition by the designated process instance name, further specifying the work item which can be started upon start of the process instance and setting the state of the work item to the "ready" state.

The "work completion request" command is transmitted from the client request processing unit 0151 and the business program execution control unit 0153. The "work completion request" command is a command for receiving the process definition name, the process instance name and the work definition name, setting the sate of the designated work item to the "completed" state, specifying the work item which can be started newly and setting the state of the work item to the "ready" state.

Processing at the time that the workflow implementation state control unit 0152 receives the command is now described.

When the "process instance start request" command is received, information of each work definition 0220 defined in the designated process definition 0141 is retrieved from the work definition information table 0411 using the process definition name as key, and a record of the work corresponding to each work definition 0220 is inserted into the workflow implementation state table 0611. At this time, the state 0605 of each work is set to the "initial" state.

The process instance name and the process definition name designated upon reception of the command are set in the columns of the process instance name 0601 and the process definition name 0602, respectively. The work definition name 0402 and the work information 0404 which are attribute information of the work definition 0220 corresponding to the record are set in the columns of work definition name 0603 and the work information 0604, respectively.

Further, the directed graph of the process definition 0141 is traced from the start node 0201 to decide the work definition 0220 to be implemented first, and the state 0605 of the work item corresponding to the work definition is set to the "ready" state. Then, the "work start notification" command is transmitted to the priority control unit 0154. Further, when the work classification 0403 of the work definition 0220 is the "automatic implementation", a business program execution command is transmitted to the business program execution control unit 0153.

When the "work completion request" command is received, the state of the work item for the designated work definition of the designated process instance is set to the "completed" state, and the work definition to be implemented next to the designated work definition is decided in accordance with the directed graph of the process definition 0141. The state 0605 of the work item for the work definition to be implemented next is set to the "ready" state. Further, the process definition name, the process instance name and the work definition name of the work item updated to the "completed" state are designated, and the "work completion notification" command is transmitted to the priority control unit 0154.

Further, the process definition name, the process instance name and the work definition name updated to the "ready" state are designated, and the "work start notification" command is transmitted to the priority control unit 0154. At this time, when the work classification 0403 of the work item updated to the "ready" state is the "automatic implementation", the business program execution command is transmitted to the business program execution control unit 0153.

When the business program execution control unit 0153 receives the "business program execution" command transmitted from the workflow implementation state control unit 0152, the control unit 0153 transmits the start request to the invoked application 0102.

The business program execution control unit 0153 includes a start request receiving unit and a business program start unit. The start request receiving unit receives the business program execution command from the workflow implementation state control unit 0152 and stores the received implementation request in the business program execution request management information 0144. The business program start unit takes out the start request from the business program execution request management information 0144 in order of the processing priority of the work items at regular intervals and transmits the execution request to the invoked application 0102. Further, the business program start unit acquires the result to the implementation request.

Next, the processing procedure of the start request receiving unit of the business program execution control unit 0153 is described.

Operation at the time that the start request receiving unit receives the business program execution command from the workflow implementation state control unit 0152 is as follows.

The start request receiving unit receives the business program execution command from the workflow implementation state control unit 0152. At this time, the process definition name, the work definition name, the process instance name and the name of the invoked application are received from the workflow implementation state control unit 0152. Then, the start request receiving unit obtains the present date. The date can be obtained by calling out a system call provided by an operating system, for example. The present date obtained in the above processing and the implementation request received from the workflow implementation state control unit 0152 are inserted into the business program execution request management table 0811.

Next, the processing procedure of the business program start unit of the business program execution control unit 0153 is described.

Figure 7:
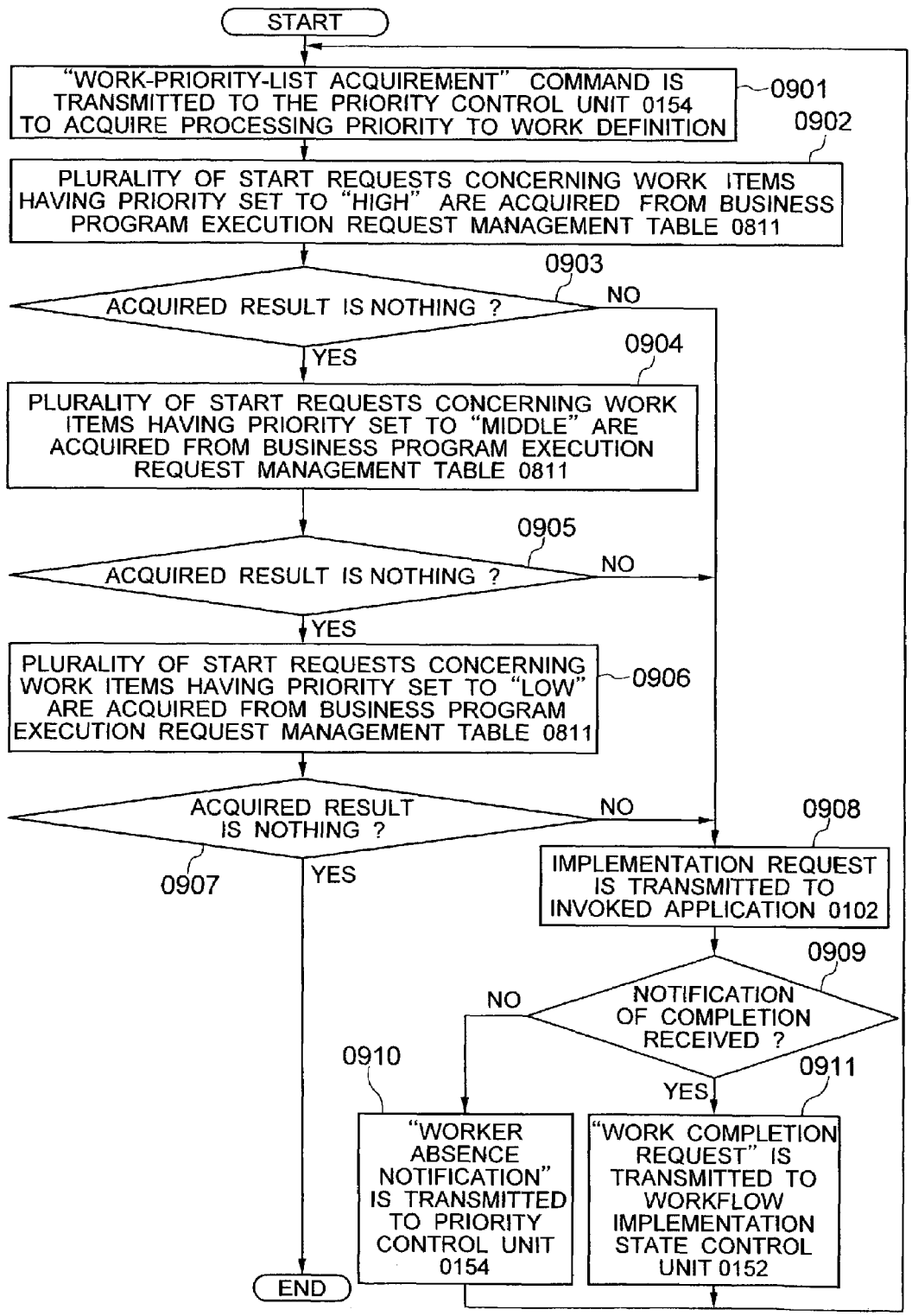
FIG. 7 is flow chart showing processing procedure of a business program start unit in the embodiment contained in the present invention.

FIG. 7 is a flow chart showing the processing procedure at the time that the business program start unit in the embodiment transmits the implementation request of the work processing to the invoked application. The processing procedure shown in FIG. 7 is repeatedly performed by the business program start unit. This repetition may be made at intervals of predetermined time.

In step 0901, a "work-priority-list acquirement" command is transmitted to the priority control unit 0154 to thereby acquire a list of work items managed in the workflow management engine 0101. At this time, each of the work items in the list is specified by the process definition name, the process instance name and the work definition name and holds the processing priority of the work item as attribute information.

In step 0902, one start request having the oldest occurrence date among the start requests concerning the work items having the priority set to "high" is acquired from the acquired result of step 0901. The start request is acquired from the business program execution request management table 0811 on the basis of the process definition name 0801, the work definition name 0802 and the processing instance name 0803 used as key.

In step 0903, when the retrieval result in step 0902 is nothing, the process proceeds to step 0904, and otherwise the process proceeds to step 0908.

In step 0904, one start request having the oldest occurrence date among the start requests concerning the work items having the priority set to "middle" is acquired from the acquired result of step 0901. The start request is acquired from the business program execution request management table 0811 on the basis of the process definition name 0801, the work definition name 0802 and the processing instance name 0803 used as key.

In step 0905, when the retrieval result in step 0904 is nothing, the process proceeds to step 0906, and otherwise the process proceeds to step 0908.

In step 0906, one start request having the oldest occurrence date among the start requests concerning the work items having the priority set to "low" is acquired from the acquired result of step 0901. The start request is acquired from the business program execution request management table 0811 on the basis of the process definition name 0801, the work definition name 0802 and the processing instance name 0803 used as key.

In step 0907, when the retrieval result in step 0906 is nothing, the process is ended, and otherwise the process proceeds to step 0908.

In step 0908, the start processing request acquired in step 0902, 0904 or 0906 is transmitted to the invoked application 0102, and a response is received from the invoked application 0102.

In step 0909, when the response from the invoked application 0102 acquired in step 0908 is notification of completion, the process proceeds to step 0911. When the response is notification of trouble occurrence, the process proceeds to step 0910.

In step 0910, the "worker absence notification" command is transmitted to the priority control unit 0154 while designating the name of the invoked application which transmits the trouble occurrence notification and the process returns to step 0901. The name of the invoked application can be obtained from the work information 0804 of the business program execution request management table 0811.

In step 0911, the "work completion notification" command is transmitted to the workflow implementation state control unit 0152 while designating the work item processed and the process returns to step 0901.

The priority control unit 0154 receives the "worker absence notification" command, the "worker return notification" command, the "work start notification" command, the "work completion notification" command and the "work-priority-list acquirement" command.

The "worker absence notification" command is called out by the client request processing unit 0151 and the business program execution control unit 0153. For the "worker absence notification" command, the name of the worker who is absent or the name of the invoked application in which any trouble occurs is received, and the worker load information 0143 is updated.

The "worker return notification" command is called out by the client request processing unit 0151. In response to the "worker return notification" command, the name of the worker returned or the name of the invoked application recovered from trouble is received, and the worker load information 0143 is updated.

The "work start notification" command is called out by the workflow implementation state control unit 0152. In response to the "work start notification" command, the process definition name and the work definition name of the work item set to the "ready" state are received, the worker or the invoked application assigned to the work item is specified, and the worker load information 0143 is updated.

The "work completion notification" command is called out by the workflow implementation state control unit 0152. In response to the "work completion notification" command, the name of the process definition and the name of the work definition set to the "completed" state are received, the worker or the invoked application assigned to the work item is specified, and the worker load information 0143 is updated.

The "work-priority-list acquirement" command is called out by the client request processing unit 0151 and the business program execution control unit 0153, and a list of work items managed in the workflow implementation state table 0611 is returned. At this time, in response to the "work-priority-list acquirement" command, the processing priority for each work item in the list of work items is decided properly and the decided processing priority is established as attribute information of each work item. For example, the processing priority of the work influenced by a stagnated work is changed to "low".

Details of processing of each command are now described.

Details of processing at the time that the priority control unit 0154 has received the "worker absence notification" command are as follows. For the "worker absence notification" command, the worker's name or the name of the invoked application is received and a record having the worker's name or the name of the invoked application in the column of the work information 0701 is acquired from the worker load information table 0711. The effective flag 0703 of the record is changed to "No".

Details of processing at the time that the priority control unit 0154 has received the "worker return notification" command are as follows. For the "worker return notification" command, the worker's name or the name of the invoked application is received, and a record having the worker's name or the name of the invoked application in the column of the work information 0701 is acquired from the worker load information table 0711. The effective flag 0703 of the record is changed to "Yes".

Details of processing at the time that the priority control unit 0154 has received the "work start notification" command are as follows.

First, the work definition is retrieved from the work definition information table 0411 using the process definition name and the work definition name designated by the command as key to thereby acquire the worker's name or the name of the invoked application. That is, the work information 0404 of the work definition having the process definition name and the work definition name as the process definition name 0401, and the work definition name 0402 is acquired. Then, a record having the worker's name or the name of the invoked application acquired in the processing in the column of the work information 0701 is retrieved from the worker load information table 0711. Further, the number of unimplemented works 0702 of the record is incremented by "1".

For the "work completion notification" command, the process definition name and the work definition name of the work item set to the "completed" state are received. Details of processing at the time that the priority control unit 0154 has received the "work completion" notification command are as follows. First, the work information 0404 of the work definition having the process definition name and the work definition name designated by the work completion notification command in the process definition name 0401 and the work definition name 0402 is acquired from the work definition information table 0411. A record having the work information acquired in the processing in the column of the work information 0701 is retrieved from the worker load information table 0711 and the number of unimplemented works 0702 of the record is decremented by "1".

An outline of processing at the time that the priority control unit 0154 has received the "work-priority-list acquirement" command is as follows.

In the "work-priority-list acquirement", first, a worker or the invoked application in the stagnation state is specified (step A). Second, a stagnated work is specified (step B). Further, the work range influencing the progress of business due to the stagnated work is specified (step C). Thereafter, a list of work items managed in the workflow implementation state table 0611 is acquired, and the processing priority of each work item is decided properly (step D). Finally, a list of work items is returned to the command request source.

Each processing is now described.

Some methods for the specifying process (step A) of the worker or the invoked application in the stagnation state are first described. These methods correspond to notification of a worker being absent, occurrence of trouble in the invoked application and judgment of a stagnation state in a worker or an invoked application on the basis of the previously defined threshold.

First, contents of processing for notification of a worker being absent and occurrence of trouble in the invoked application are described. This processing copes with the case where a worker is judged to be in the stagnation state when notification of the worker being absent from work is received, and the case where an invoked application is judged to be in the stagnation state when trouble occurs in the invoked application. In the processing, the work information 0701 having the effective flag 0703 set to "No" is retrieved from the worker load information table 0711 to thereby specify the worker or the invoked application in the stagnation state.

Next, contents of processing for judgment as to whether the worker or the invoked application is in the stagnation state on the basis of the previously defined threshold are described. In the processing, when the total of the number of stagnation states in the work assigned to the worker or the invoked application exceeds the threshold, the worker or the invoked application is judged to be in the stagnation state. In the processing, the work information 0701 having the number of unimplemented works 0702 exceeding the stagnation threshold 0704 is acquired from the worker load information table 0711 to thereby make it possible to specify the name of the worker or the invoked application in the stagnation state.

Next, some methods for the specifying process (step B) of the stagnated work are described. The methods correspond to judgment of the stagnation state of work based on the previously defined threshold and judgment that the work assigned to the worker or the invoked application in the stagnation state is a stagnated work.

First of all, contents of processing for judging that the work is in the stagnation state on the basis of the previously defined threshold are described. In the processing, when the number of stagnation states in each work exceeds the threshold, the work is judged to be in the stagnation state. Its detailed processing procedure is as follows. First, the workflow implementation state table 0611 is retrieved and the number of records having the state 0605 set to the "ready" state is counted for each work definition. Thus, the number of works set to the "ready" state can be acquired for each work definition. Next, the name of work definition having the number of works set to the "ready" state exceeding the threshold set in the work definition is specified and this specified work definition is judged to be a stagnated work. The threshold set in each work definition is acquired by retrieving the stagnation threshold 0407 from the work definition information table 0411 using the process definition name 0401 and the work definition name 0402 as key.

Next, contents of processing for judging the work assigned to the worker or the invoked application in the stagnation state to be a stagnated work are described. In the processing, by acquiring the work definition having, in the work information 0404, the worker or the invoked application in the stagnation state acquired in step A from the work definition information table 0411, the stagnated work can be specified.

Next, the processing (step C) for specifying the work range influencing the progress of business due to the stagnated work specified in the above processing is described.

Figure 8:
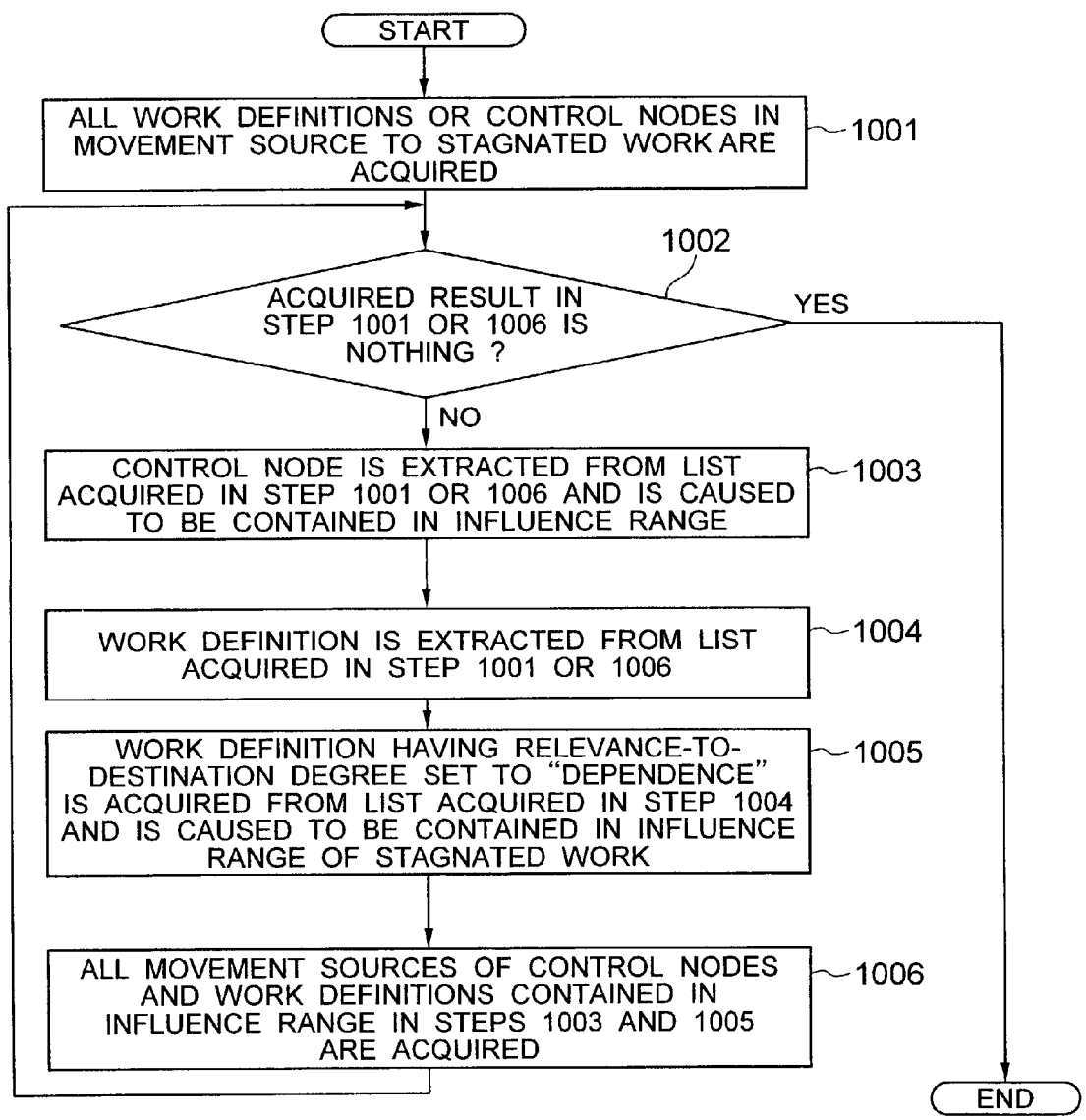
FIG. 8 is a flow chart showing processing procedure for specifying an influence range of a stagnated work in the embodiment contained in the present invention.

The priority control unit 0154 traces the process definition 0141 in the opposite direction from the stagnated jog to thereby decide the influence range of the stagnated work. Details of the processing is shown in FIG. 8. The tracing operation of the process definition in the opposite direction means tracing operation made conversely to the processing order defined in the process definition.

FIG. 8 is a flow chart showing the processing procedure for specifying the influence range of the stagnated work in the embodiment. In step 1001, all of the work definitions or control nodes in a movement source to the stagnated work are acquired. The movement source to the stagnated work is acquired by retrieving the movement source 0502 of the record having the work definition name of the stagnated work in the movement destination 0503 from the arrow definition information table 0511.

In step 1002, when the acquired result in step 1001 or 1006 is nothing, the process is ended. Otherwise, the process proceeds to step 1003.

In step 1003, a control node is extracted from the work definitions and the control nodes acquired in step 1001 or 1006, and the extracted control node is caused to be contained in the influence range of the stagnated work. The extraction of the control node is made by acquiring a list of control node names 0302 from the control node definition information table 0311 and referring to the list.

In step 1004, a work definition is extracted from the work definitions and control nodes acquired in step 1001 or 1006. The extraction of the work definition is made by acquiring a list of work definition names 0402 from the work definition information table 0411 and referring to the list.

In step 1005, a work definition having the relevance-to-destination degree set to the "dependence" is acquired from the list of work definitions acquired in step 1004, and the acquired work definition is caused to be contained in the influence range of the stagnated work. The relevance-to-destination degree is acquired by retrieving the relevance-to-destination degree 0405 from the work definition information table 0411 using the work definition name as key.

In step 1006, the movement source of the work definition and the control node contained in the influence range in steps 1003 and 1005 are retrieved. The movement source is acquired by retrieving the movement source 0502 having the work definition name or the control node name in the movement source 0503 from the arrow definition information table 0511.

In step 1005 of the above processing, the work having the relevance-to-destination degree set to "dependence" is registered in the influence range of the stagnated work. Further, it is judged whether the movement source of the work is contained in the influence range or not. Accordingly, the relevance-to-destination degree of the work can be set to the "independence", so that when a stagnated work occurs in the movement destination of the work, the work and the movement source of the work can be controlled not to be contained in the influence range caused by the stagnated work. In the processing, the relevance to the movement destination is defined for each work definition to thereby designate the influence range of the stagnated work, while the influence range may be defined directly for each work definition. An example of contents stored in the auxiliary storage apparatus 0167 in the influence range is shown in FIG. 9.

FIG. 9 is a diagram showing an example of an influence range definition table in the embodiment. In the influence range definition table 1111 shown in FIG. 9, the work definition influencing the progress of business when the work definition designated by the process definition name 1101 and the work definition name 1102 becomes a stagnation state is shown in an influencing work definition name 1103.

Further, in the processing, the movement source of the "split node" is also retrieved to thereby specify the work which can move to the stagnated work. At this time, only when all the movement destinations of the "split node" are contained in the influence range of the stagnated work, the movement source of the "split node" can be retrieved to thereby specify the work which can move to the stagnated work exactly.

For example, the processing in step 1003 can be modified as follows to realize the above processing. First, the control node is extracted from the work definitions and the control nodes acquired in step 1001 or 1006. Next, the control node having the node classification excluding the "split node" is acquired from the list of control nodes acquired in the above processing and is caused to be contained in the influence range of the stagnated work. The node classification is made sure by retrieving the node classification 0303 from the control node definition information table 0311 using the control node name 0302 as key. Further, the control node having the node classification set to the "split node" is acquired from the list acquired in step 1001 or 1006. Moreover, the movement destination of the "split node" acquired in the processing is examined, and when the movement destination is contained in the influence range, the control node is caused to be contained in the influence range. The movement destination of the control node can be acquired by retrieving the movement destination 0503 from the arrow definition information table 0511 using the movement destination 0502 as key.

Next, the processing (step C) that the priority control unit 0154 decides the processing priority of each work item properly is described. In this processing, the processing priority of each work item contained in the influence range of the stagnated work specified in the step B is reduced to produce a list of work items. This processing is now described.

First, the work item having the state 0605 set to the "ready" is acquired from the workflow implementation state table 0611 using the column of the state 0605 as key. The work item is uniquely decided by the process definition name, the process instance name and the work definition name and each value can be acquired on the basis of the process instance name 0601, the process definition name 0602 and the work definition name 0603. Next, the processing priority for each work item is established. In the work item contained in the influence range, the processing priority of the work is set to "low". The work item which is not contained in the influence range acquires the priority 0406 corresponding to the work from the work definition information table 0411 using the process definition name 0401 and the work definition name 0402 as key.

Finally, the priority control unit 0154 returns the list of the work items acquired in the processing to the calling source of the "work-priority-list acquirement" command.

The processing for reducing the processing priority of each work item contained in the influence range of the work in the stagnation state has been described. Further, the following processing can be also performed to realize that the priority of each process instance contained in the influence range is reduced. The processing for reducing the priority of each process instance will be described below.

First, a list of process instance names 0601 having, in the work definition name 0603, the work contained in the influence range and having the state 0605 set to the "ready" is acquired from the workflow implementation state table 0611. Further, the work item having the state 0605 set to the "ready" is acquired from the workflow implementation state table 0611 using the column of the state 0605 as key. The work item is uniquely decided by the process definition name, the process instance name and the work definition name, and each value can be acquired on the basis of the process instance name 0601, the process definition name 0602 and the work definition name 0603.

Next, the processing priority with regard to each work item is established. When the process instance name of the work item is contained in the list of process instance names acquired before, the priority is set to "low", and when it is not contained, the priority 0406 corresponding to the work item is acquired from the work definition information table 0411 using the process definition name 0401 and the work definition name 0402 as key. Finally, the list of work items acquired in the processing is returned to the calling source of the "work-priority-list acquirement" command.

In the processing, the processing priority of each work has been decided on the basis of the stagnation state, while the processing priority can be decided in consideration of the inactive or idle state of the worker or the invoked application upon the "work-priority-list acquirement". The processing can modify the processing priority so that the worker or the invoked application in the inactive or idle state to which the work in the "ready" state is not assigned is utilized effectively.

An outline of the processing is now described.

In the "work-priority-list acquirement", the steps A to D are first implemented in the same manner as the processing priority of each work is decided on the basis of the stagnation state. Next, the worker or the invoked application in the inactive or idle state is judged (step E). Further, the work assigned to the worker or the invoked application in the inactive or idle state is judged to the inactive or idle state, and the work range in which the work can be moved to the work in the inactive or idle state is specified on the basis of the flow definition (step F). Finally, the processing priority of the work contained in the work range is set to be high (step G). An example of realization of each step is now described.

The judgment processing (step E) of the worker or the invoked application in the inactive or idle state is performed by acquiring the work information 0701 having the number of unimplemented works 0702 smaller than the inactivity threshold 0705 and the effective flag 0703 set to "Yes" from the worker load information table 0711.

Next, the specifying processing (step F) of the work range for modifying the processing priority is described in detail. First, the work definition name 0402 having, in the work information 0404, the worker or the invoked application in the inactive or idle state acquired in step E is acquired from the work definition information table 0411. Next, the work range in which the work can be moved to the work definition acquired in the processing is specified by tracing the process definition in the opposite direction. The processing for specifying the work range is performed by the same processing as the specifying processing (step B) of the work range influencing the progress of the work due to the stagnated work. Finally, the work contained in the work range influenced by the stagnated work is removed from the work range acquired in the processing.

Finally, in the priority control processing (step G), the priority of the work contained in the work range obtained in the processing is modified to "high".

As described above, the priority order of the process instance influenced by the stagnated work can be made low to thereby suppress occurrence of the stagnated process instance. Further, to make the priority order low contains to make lower than its own priority established previously and to make lower than the priority of the work not influenced.

Particularly, when a plurality of works are assigned to the same worker or invoked application, the business which is not influenced by the stagnated work definition is processed preferentially to make it possible to assign the computer resources and the human resources to the work of which the progress of business is not influenced by the stagnated work.

Further, the priority order may be modified so that the business which is less influenced by the stagnated work is processed preferentially after the business which is not influenced by the stagnated work definition has been processed preferentially.

Figure 10:
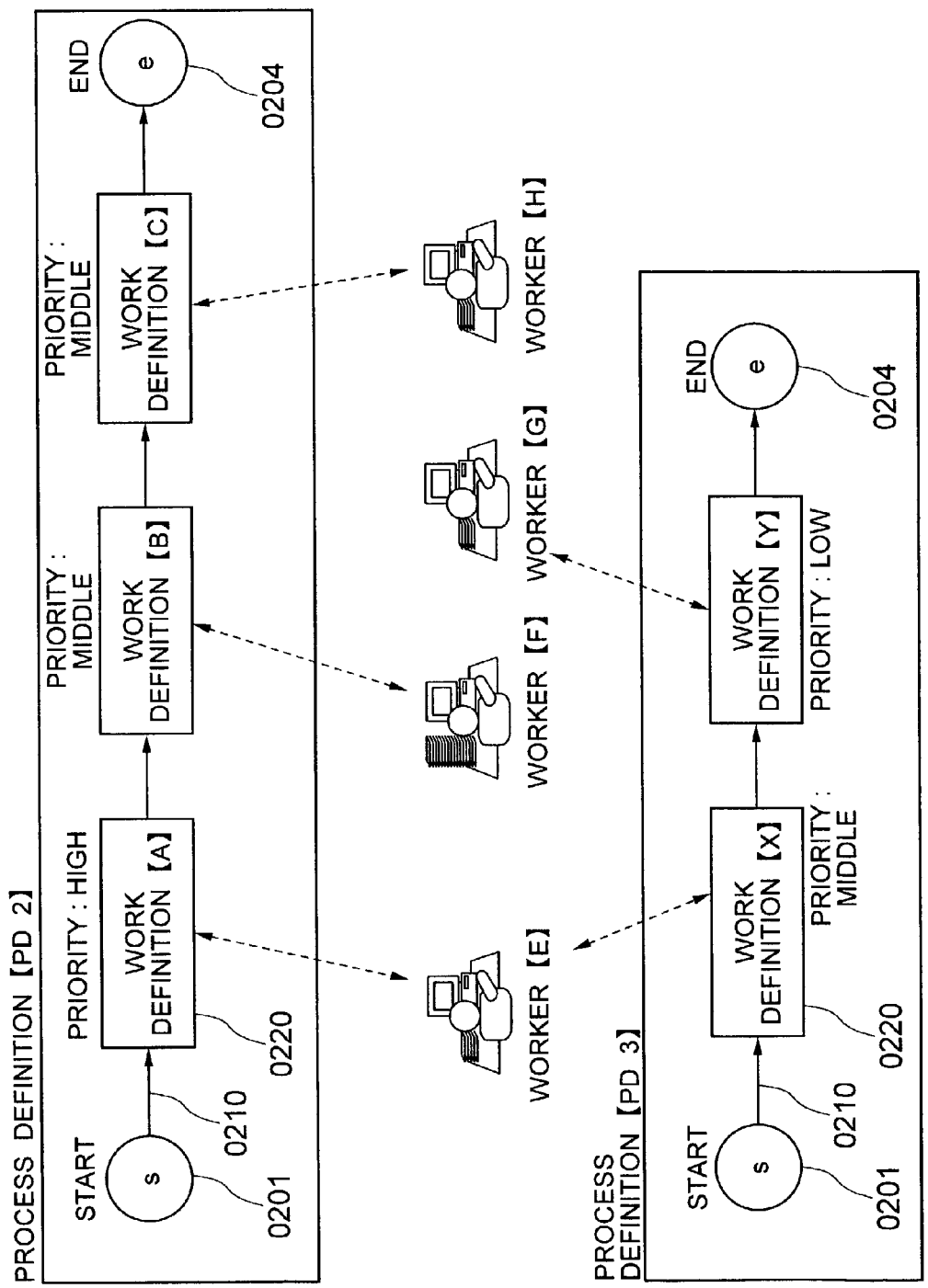
FIG. 10 is a diagram illustrating a first definition example of the process definition 0141 in the embodiment contained in the present invention.

FIG. 10 is a diagram showing a first definition example of the process definition 0141 in the embodiment. For example, in process definitions "PD2" and "PD3" as shown in FIG. 10, a worker "E" assigned work definitions "A" and "X" decides a work to be processed on the basis of the priorities of the work definitions "A" and "X".

At this time, when a worker "F" is in the stagnation state, a work B is a stagnated work, and since the work definition "A" is contained in the influence range of the stagnated work B, the priority of the work definition "A" is modified to "low". Thus, the worker "E" implements the processing concerning the work definition "X" more preferentially than the work definition "A", so that it is possible to suppress a stagnated process instance from occurring further. Moreover, an amount of works to a worker "G" is increased due to the above processing and the priority of the work definition "A" is modified to thereby make it possible to utilize the worker "G" effectively.

Figure 11:
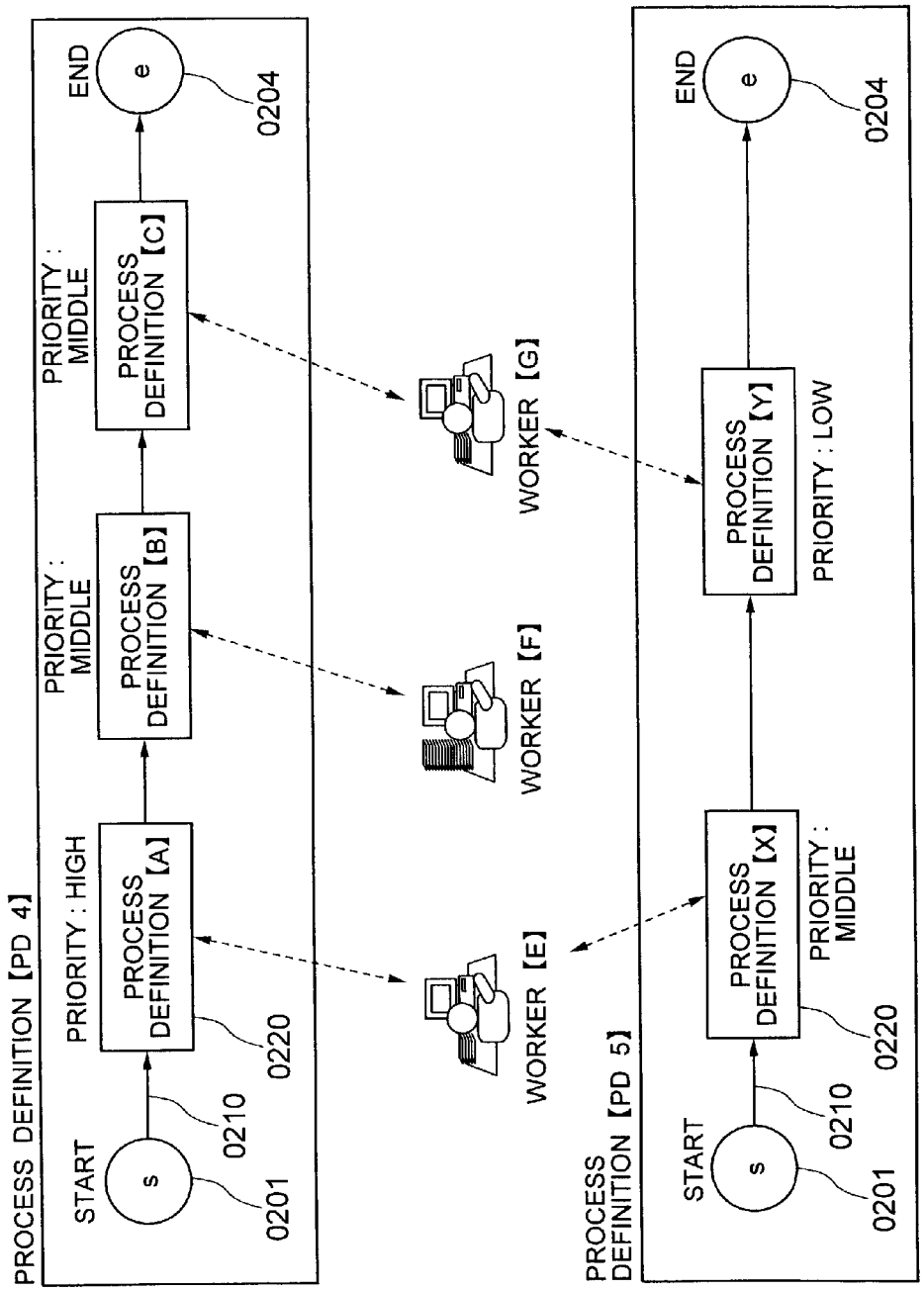
FIG. 11 is a diagram illustrating a second definition example of the process definition 0141 in the embodiment contained in the present invention.

FIG. 11 is a diagram showing a second definition example of the process definition 0141 in the embodiment. In the case of process definitions "PD4" and "PD5" as shown in FIG. 11, when a worker "F" is in a stagnation state due to absence or the like, stagnation occurs in movement from a work definition "B" to a work definition "C" and an amount of works to a worker "G" is reduced.

At this time, the priority of the work definition "A" contained in the influence range of the stagnated work B is modified to "low", so that the worker "E" processes the process definition "PD5" preferentially. Thus, movement from the work definition "X" to the work definition "Y" can increase and reduction of the work amount to the worker "G" due to the stagnation of the work B can be suppressed.

Figure 12:
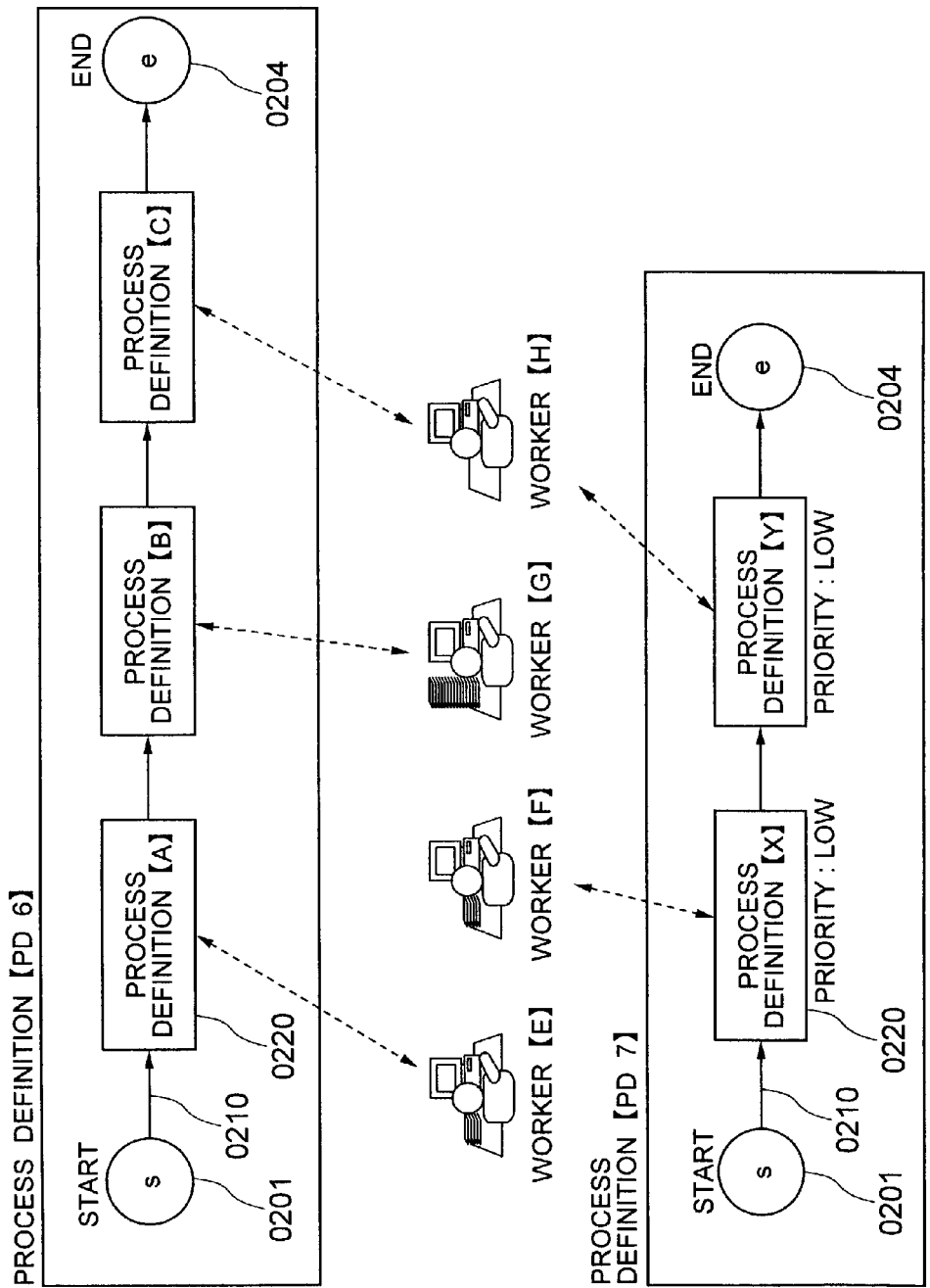
FIG. 12 is a diagram illustrating a third definition example of the process definition 0141 in the embodiment contained in the present invention.

FIG. 12 is a diagram showing a third definition example of the process definition 0141 in the embodiment. Further, as in the case of process definitions "PD6" and "PD7" shown in FIG. 12, even when workers in the stagnation state and the inactive or idle state are mixed, the processing priority can be modified properly on the basis of the inactive or idle state and the stagnation state to thereby distribute the computer resources and the human resources properly.

In the above case, the processing priority of a work definition "A" is modified to "low" due to influence of a worker "G" in the stagnation state. On the other hand, the processing priorities of work definitions "X" and "Y" are modified to "high" due to a worker "H" in the inactive or idle state. A worker "F" processes the process definition "PD7" preferentially in accordance with the priority control. Consequently, work is assigned to the worker "H" and the worker "H" can be utilized effectively.

Further, the priority control is performed by the workflow management system on the basis of the number of works for each worker and the trouble occurrence notification from the invoked application, and accordingly time and labor of operation by the system manager can be reduced.

As described above, according to the workflow management system of the embodiment, since the processing priority of each work is modified in accordance with a stagnation state of work, the computer resources and the human resources can be distributed to the process instance of which the progress of business is not influenced due to the stagnated work preferentially when the stagnated work occurs.

Further, according to the workflow management system of the embodiment, since the stagnation state is judged on the basis of the previous defined threshold, the threshold can be modified in accordance with the process instance to thereby judge the stagnation state of work in various process instances.

Moreover, according to the workflow management system of the embodiment, since the stagnation state of work is judged on the basis of the stagnation state in the worker or the invoked application, the work stagnated by the individual worker or invoked application can be detected effectively.

According to the embodiment, since the processing priority of each work is modified in accordance with the stagnation state of work, the computer resources and the human resources can be distributed to the process instance of which the progress of business is not influenced due to a stagnated work preferentially when the stagnated work occurs.

Further, in the embodiment, the priority is set to "low", while the priority may be made lower than the previously set priority such as, for example, modification from "high" to "middle".

In addition, in the embodiment, the work influenced by the stagnated work is detected to modify the priority of the detected work. However, the priority of the work which is not influenced by the stagnated work may be modified. For example, the work of which the progress of business is influenced due to the stagnated work may be detected, and the work excluding the detected work may be specified to make the priority of the specified work higher. Further, the priority of the specified work may be set to "high" or "middle". For the purpose of detection of the work influenced, the method of specifying the "range of work" as described above may be used.

Moreover, the process for making the priority lower and the process for making the priority higher may be used together. That is, the priority of the work influenced may be made lower than the previously set priority and the priority of the work not influenced may be made higher than the previously set priority. Further, the priority of the work influenced may be set to "low" and the priority of the work not influenced may be set to "high". Further, the priority of the work not influenced may be made higher than the priority of the work influenced. To this end, data useful to grasp the priority of each work is provided in the system.

Furthermore, the processing that the priority of the work influenced is made lower than the previously set priority of its own work and lower than the priority of the work not influenced is contained in the embodiment.

It should be further understood by those skilled in the art that the foregoing description has been made on embodiments of the invention and that various changes and modifications may be made in the invention without departing from the spirit of the invention and the scope of the appended claims.

The invention claimed is:

1. A workflow system for controlling a business, which includes a plurality of works, based on process definition information which defines correspondence relation of said works, comprising:
   a bus;
   a memory connected to said bus and for storing programs;
   a communication apparatus connected to a network and said bus, said network being connected to a plurality of computers, each configured to implement any of said plurality of works; and
   a processing apparatus connected to said memory through said bus, and for detecting progress states of works implemented by said plurality of computers through communication with said plurality of computers through said communication apparatus, specifying a stagnated work based on said detected progress states, specifying a work which creates workload on the stagnated work based on the process definition information, specifying a worker or a business application which is assigned to the specified work, and controlling the specified worker or business application to process other work assigned to said specified worker or business application more preferentially than said specified work,
   wherein the other work is work other than said specified work.

2. The workflow system according to claim 1, wherein said processing apparatus detects a processing priority which has been previously set to said specified work, and modifies the processing priority of said specified work to be lower than said processing priority which has been previously set.

3. The workflow system according to claim 1, wherein said processing apparatus obtains respective processing priorities of said plurality of works, and sets a processing priority of said specified work to be lower than a processing priority of the other work assigned to said specified worker or business application.

4. The workflow system according to claim 1, wherein said processing apparatus sets a processing priority of said specified work to be lower than a processing priority which has been previously set.

5. A workflow system for controlling a business, which includes a plurality of works, based on process definition information which defines correspondence relation of said works, comprising:
   a bus;
   a memory connected to said bus and for storing programs;
   a communication apparatus connected to a network and said bus, said network being connected to a plurality of computers each implementing any of said plurality of works; and
   a processing apparatus connected to said memory through said bus, and for detecting progress states of works implemented by said plurality of computers through communication with said plurality of computers through said communication apparatus, specifying a stagnated work based on said detected progress states, specifying a work which creates workload on the stagnated work based on the process definition information, specifying a worker or a business application which is assigned to the specified work, and modifying a processing priority of the specified work such that the specified worker or business application assigned to the specified work preferentially processes other work assigned to said specified worker or business application,
   wherein the other work is work other than said specified work.

6. The workflow system according to claim 5, wherein said processing apparatus obtains a processing priority which has been previously set to said other work assigned to said specified worker or business application, and modifies a processing priority of said other work assigned to said specified worker or business application to be higher than said processing priority which has been previously set.

7. The workflow system according to claim 5, wherein said processing apparatus obtains respective processing priorities of said plurality of works, and sets a processing priority of said other work assigned to said specified worker or business application to be higher than a processing priority of the specified work.

8. The workflow system according to claim 5, wherein said processing apparatus sets a processing priority of said other work assigned to said specified worker or business application to be higher than a predetermined reference.

9. The workflow system according to claim 5, wherein said stagnated work includes a plurality of sub-works, and
wherein said processing apparatus specifies as a stagnated work a work in which a number of sub-works which are in a ready state is larger than a predetermined threshold.

10. A workflow control method of controlling, by use of a computer, a business, which includes a plurality of works, based on process definition information which defines correspondence relation of said works, comprising following steps according to a program stored in a computer readable recording medium:
a step of detecting progress states of works implemented by a plurality of computers which are connected to said computer through a network;
a step of specifying a stagnated work based on said detected progress states;
a step of specifying a work which creates workload on the stagnated work based on the process definition information;
a step of specifying a worker or a business application which is assigned to the specified work;
a step of controlling the specified worker or business application to process other work assigned to said specified worker or business application more preferentially than said specified work,
wherein said other work is work other than said specified work; and
a step of controlling said business in accordance with said processing priority.

11. The workflow control method according to claim 10, wherein said step of specifying a work which creates workload on the stagnated work specifies, based on said process definition information, a range of works of which progress is affected due to the stagnation of said stagnated work, and specifies a work, which is contained in the specified range as said work which creates workload on the stagnated work.

12. The workflow control method according to claim 10, further comprising a step of detecting a processing priority which has been previously set to said specified work which creates workload on the stagnated work,
wherein said step of setting a processing priority modifies a processing priority of said specified work which creates workload on the stagnated work to be lower than said processing priority which has been previously set.

13. The workflow control method according to claim 10, further comprising a step of:
detecting respective processing priorities of said plurality of works,
wherein said step of setting a processing priority sets a processing priority of said specified work which creates workload on the stagnated work to be lower than processing priorities of other works assigned to said specified worker or business application.

14. The workflow control method according to claim 10, wherein said step of setting a said processing priority sets a processing priority of the specified work which creates workload on the stagnated work to be lower than a predetermined reference.

15. The workflow control method according to claim 10, wherein said stagnated work includes a plurality of sub-works, and
wherein said step of specifying a stagnated work specifies a work in which a number of sub-works which are not completed is larger than a predetermined threshold as a stagnated work.

16. A workflow control method of controlling, by use of a computer, a business, which includes a plurality of works, based on process definition information which defines correspondence relation of said works, comprising the following steps according to a program stored in a computer readable recording medium:
a step of detecting progress states of works implemented by a plurality of computers which are connected to said computer through a network;
a step of specifying a stagnated work based on said detected progress states;
a step of specifying a work which creates workload on the stagnated work based on the process definition information;
a step of specifying a worker or a business application which is assigned to the specified work;
a step of modifying a processing priority of the specified work such that the specified worker or business application assigned to the specified work preferentially processes other work assigned to said specified worker or business application,
wherein the other work is work other than said specified work; and
a step of controlling said business in accordance with said processing priority.

17. The workflow control method according to claim 16, further comprising a step of:
specifying the other work assigned to said specified worker or business application,
wherein said step of specifying the other work assigned to said specified worker or business application specifies a work other than the specified work which creates workload on the stagnated work.

18. The workflow control method according to claim 16, further comprising:
a step of detecting a processing priority which has been previously set to said other work assigned to said specified worker or business application,
wherein said step of setting a processing priority modifies a processing priority of said other work assigned to said specified worker or business application to be higher than said processing priority which has been previously set.

19. The workflow control method according to claim 16, further comprising a step of:
detecting respective processing priorities of said plurality of works,
wherein said step of setting a processing priority sets a processing priority of other work assigned to said specified worker or business application to be higher than a processing priority of other works.

20. The workflow control method according to claim 16, wherein said step of setting a processing priority sets a processing priority of said other work assigned to said specified worker or business application to be higher than a predetermined reference.

21. A program product capable of being stored in a computer readable recording medium and for controlling a business, which includes a plurality of works, based on process definition information which defines correspondence relation of said works, said computer executing the steps of:
- a step of detecting progress states of works implemented by a plurality of computers which are connected to said computer through a network;
- a step of specifying a stagnated work based on said detected progress states;
- a step of specifying a work which creates workload on the stagnated work based on the process definition information;
- a step of specifying a worker or a business application which is assigned to the specified work;
- a step of controlling the specified worker or business application to process other work assigned to said specified worker or business application more preferentially than said specified works,
- wherein said other work is work other than said specified work; and
- a step of controlling said business in accordance with said processing priority.

22. The program product according to claim 21, wherein said step of specifying a work which creates a workload on the stagnated work specifies a range of works of which progress is affected due to stagnation of the stagnated work based on said process definition information, and specifies a work which is contained in the specified range, as said work which creates workload on the stagnated work.

23. The program product according to claim 21, further comprising a step of:
- detecting a processing priority which has been previously set to said work which creates workload on the stagnated work,
- wherein said step of setting a processing priority modifies a processing priority of said work which creates workload on the stagnated work to be lower than said processing priority which has been previously set.

24. The program product according to claim 21, further comprising a step of:
- detecting respective processing priorities of said plurality of works,
- wherein said step of setting a processing priority sets a processing priority of said work which creates workload on the stagnated work to be lower than a processing priority of the other works.

25. The program product according to claim 21, wherein said step of setting a processing priority sets a processing priority of said work which creates workload on the stagnated work to be lower than a predetermined reference.

26. The program product according to claim 21, wherein said stagnated work includes a plurality of sub-works, and
- wherein said step of specifying a stagnated work specifies a work in which a number of sub-works which are not completed is larger than a predetermined threshold as a stagnated work.

27. A program product capable of being stored in a computer readable recording medium and for controlling a business, which includes a plurality of works, based on process definition information which defines correspondence relation of said works, said computer executing the following steps:
- a step of detecting progress states of works implemented by a plurality of computers which are connected to said computer through a network;
- a step of specifying a stagnated work based on said detected progress states;
- a step of specifying a work which creates a workload on the stagnated work based on the process definition information;
- a step of specifying a worker or a business application which is assigned to the specified work;
- a step of modifying a processing priority of the specified work such that the specified worker or business application assigned to the specified work preferentially processes other work assigned to said specified worker or business application more preferentially than said specified works,
- wherein the other work is work other than said specified work; and
- a step of controlling said business in accordance with said processing priority.

28. The program product according to claim 27, further comprising a step of:
- specifying the other work assigned to said specified worker or business application,
- wherein said step of specifying the other work specifies a work other than the specified work which creates workload on the stagnated work.

29. The program product according to claim 27, further comprising:
- a step of detecting a processing priority which has been previously set to said other work assigned to said specified worker or business application,
- wherein said step of setting a processing priority modifies a processing priority of said other work assigned to said specified worker or business application to be higher than said processing priority which has been previously set.

30. The program product according to claim 27, further comprising a step of:
- detecting respective processing priorities of said plurality of works,
- wherein said step of setting a processing priority sets a processing priority of said other work assigned to said specified worker or business application to be higher than a processing priority of the specified work which creates a workload on the stagnated work.

31. The program product according to claim 27, wherein said step of setting a processing priority sets a processing priority of said other work assigned to said specified worker or business application to be higher than a predetermined reference.

* * * * *